United States Patent
Sampaio

(10) Patent No.: US 6,318,962 B1
(45) Date of Patent: Nov. 20, 2001

(54) DEVICE FOR GENERATING AN AERODYNAMIC FORCE BY ROTATIONAL MOVEMENT

(76) Inventor: Eduardo Bittencourt Sampaio, Rua São Clemente, 462, apt° 601, Rio de Janeiro, RJ (BR)

( * ) Notice: Subject to any disclaimer, the term of this patent is extended or adjusted under 35 U.S.C. 154(b) by 0 days.

(21) Appl. No.: 09/509,688

(22) PCT Filed: Sep. 30, 1998

(86) PCT No.: PCT/BR98/00079

§ 371 Date: Jun. 16, 2000

§ 102(e) Date: Jun. 16, 2000

(87) PCT Pub. No.: WO99/16666

PCT Pub. Date: Apr. 8, 1999

(30) Foreign Application Priority Data

Sep. 30, 1997 (BR) .................................................... 9704936

(51) Int. Cl.[7] .............................. B63H 9/02; B64H 11/48; F01D 1/36
(52) U.S. Cl. .................................. 416/4; 416/126; 415/90
(58) Field of Search .............................. 416/4, 124, 126; 415/90

(56) References Cited

U.S. PATENT DOCUMENTS

| | | | |
|---|---|---|---|
| 1,796,789 | * 3/1931 | Howard | 415/90 |
| 2,078,837 | * 4/1937 | Carter | 416/4 X |
| 2,655,310 | * 10/1953 | Schlumbohm | 415/90 |
| 2,954,919 | * 10/1960 | Schlumbohm | 416/4 |
| 2,996,266 | 8/1961 | Rebasti . | |
| 3,297,278 | 1/1967 | Hawkins . | |
| 3,785,592 | 1/1974 | Kerruish . | |
| 4,571,192 | * 2/1986 | Gongwer | 416/4 X |

FOREIGN PATENT DOCUMENTS

| | | |
|---|---|---|
| 370 049 | 2/1983 | (AT) . |
| 2 264 475 | 9/1993 | (GB) . |
| WO 96/07586 | 3/1996 | (WO) . |
| WO 97/29014 | 8/1997 | (WO) . |

* cited by examiner

Primary Examiner—John E. Ryznic
(74) Attorney, Agent, or Firm—Smith, Gambrell & Russell, LLP

(57) ABSTRACT

A generator of aerodynamic force by rotational movement, by means of a device which, starting from a rotational movement, induces a field of velocities in the surrounding fluid, which produces a difference in pressure on a surface, which in turn results in an aerodynamic force. The rotor element (1) is set in rotation at high speed by a motor (3). The rotational movement of the rotor element causes the fluid in which the device is immersed to assume a rotational movement, the velocity of the fluid layer that is in contact with the cylinder being equal to the velocity of a point at the surface of the cylinder. The planar element (2) separates the fluid into two regions. The fluid in the region below the surface is motionless, whereas the fluid above the surface is in motion. Since the higher the velocity of the fluid the lower its pressure, the fluid in the region below the surface exerts a higher pressure than that exerted by the fluid in the region below the surface. This difference in pressure results in a force that acts on the surface.

9 Claims, 5 Drawing Sheets

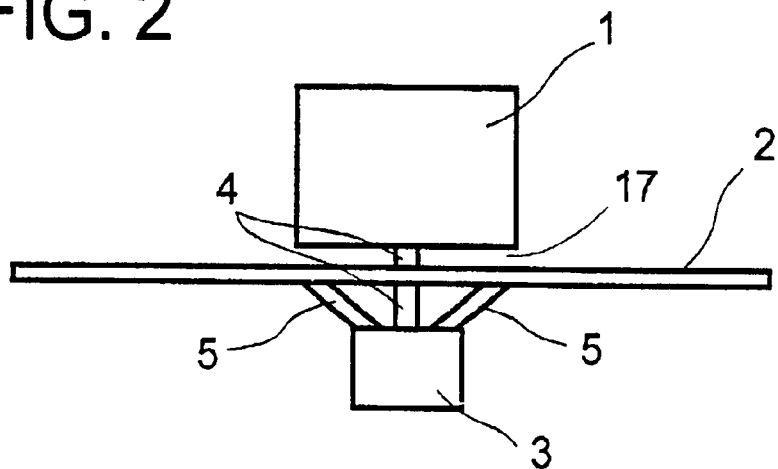
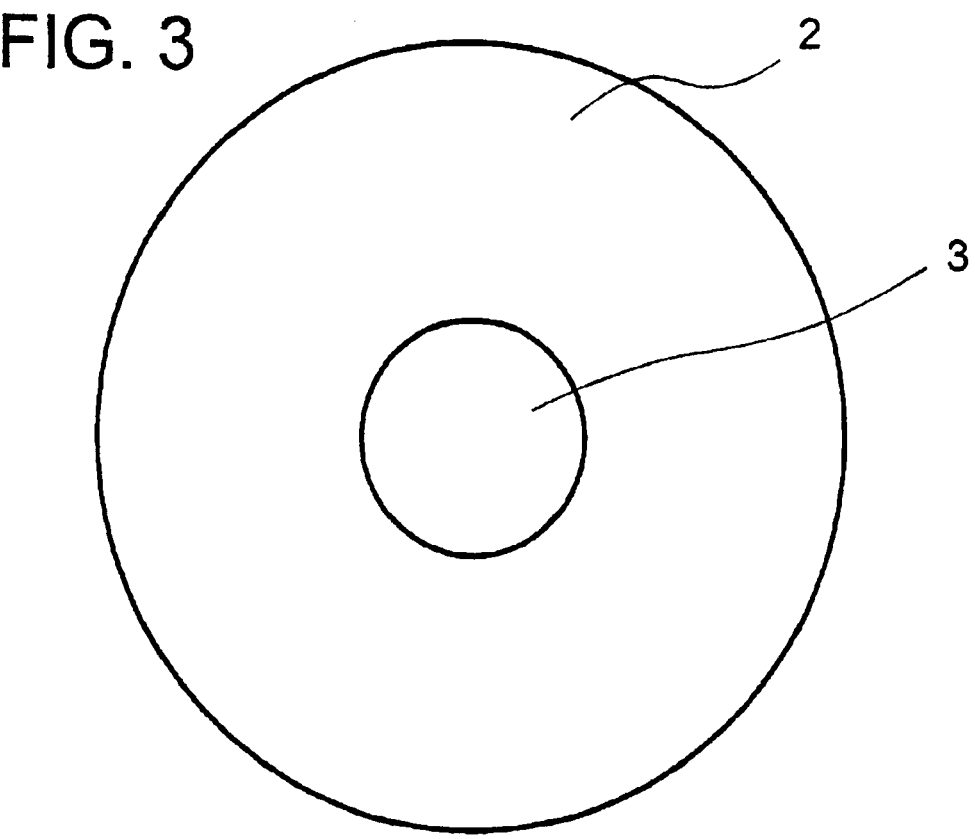

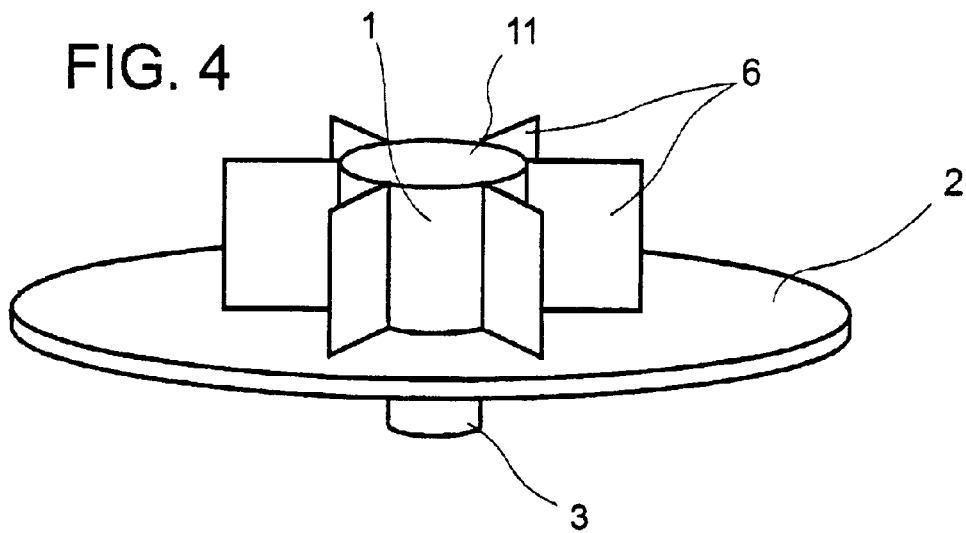
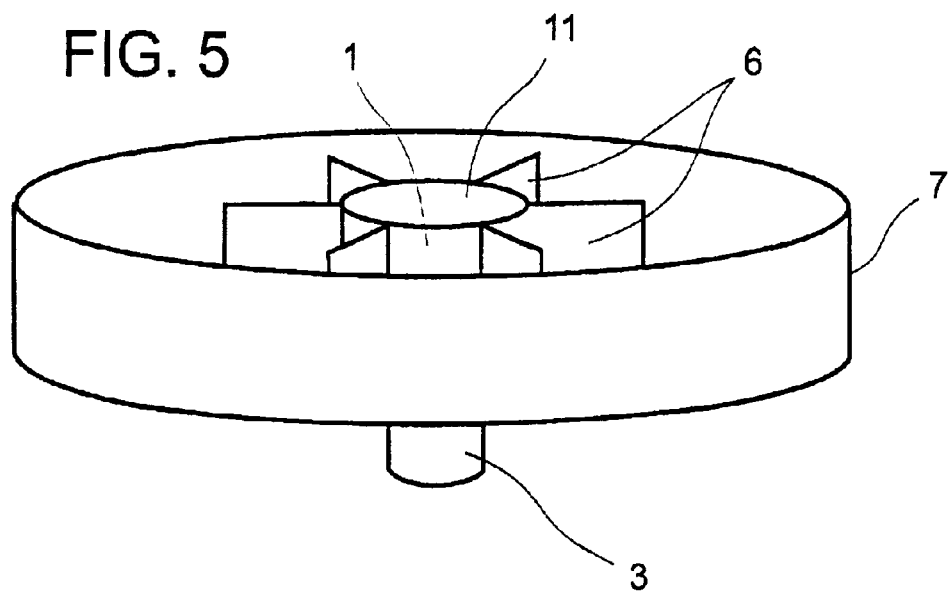

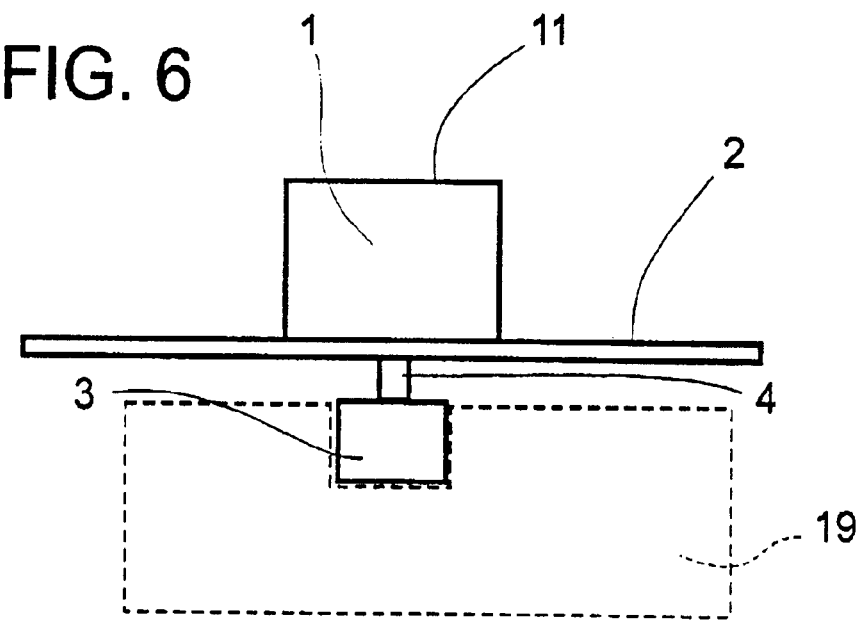
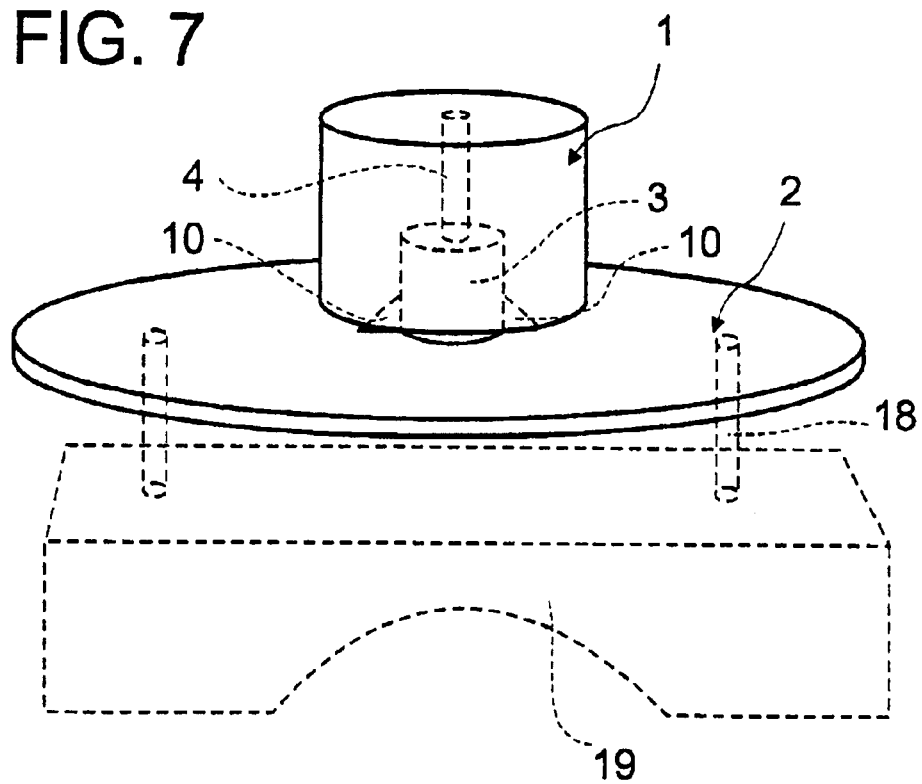

DEVICE FOR GENERATING AN AERODYNAMIC FORCE BY ROTATIONAL MOVEMENT

FIELD OF THE INVENTION

The present invention refers to aerodynamic devices and effects on moving bodies on the atmosphere through which they move. More particularly the invention refers to a rotary device with revolutional symmetry cooperating with a substantially planar element positioned adjacent to one end of the rotary device and which, under rotation induces a field of velocity in the fluid surrounding It thereby creating a pressure differential between the opposite surfaces of said substantially planar element, thus resulting in a force being generated perpendicular to one of the surfaces of the planar element, which force can be used for supporting, lifting, and/or moving an object

BACKGROUND OF THE INVENTION

An example of an example of an aerodynamic device of the prior art, which produces an aerodynamic force as a result of its movement with respect to the surrounding fluid is a propeller blade of an aircraft. When in movement, the air pressure on one of the surfaces is higher than on the other, which results in a force used, in that case, and/or propelling the aircraft. As known to those skilled in the art and disclosed in aerodynamics related literature a drag force of approximately 10 to 15 times less than the resulting lift force is required for maintaining an airfoil at constant velocity, both the lift force and drag force varying in dependence to the square of the velocity, this is to say the lift force being greater than the drag force. This is expressed by the formula:

$$L = K_L . v^2 \quad (1)$$

where L is the lift, $K_L$ is the proportionality constant for the lift force and v is velocity.

In the same way, the drag is given by:

$$F = Kd . v^2, \quad (2)$$

wherein $K_D$ is the proportionality constant for the drag force, v is the velocity, and F is the drag force.

The loss in power or wasted power varies with the cube of the velocity and may be calculated using the following formula:

$$P = F . v \quad (3)$$

wherein P is the wasted power, F is the drag and v is velocity.

Replacing in the formula for wasted power (P=F.v), the formula describing the drag force (F=Kd.v²), it follows that $$P = F . v = K_{D.v}{}^3 \quad (4)$$

which shows that the wasted power in devices of the prior art is proportional to the cube of the velocity.

On the other hand, the performance of an airfoil also depends on shape, chordwise section, angle of attack, flap design among other variables.

Therefore it would be desirable to create a device capable of generating an aerodynamic force that can be used, for instance, to support or lift bodies or carriers, consuming less power than that required in the devices of the state of the art and without regard to the many performance variables which are required in its design and construction of the same.

SUMMARY OF THE INVENTION

The invention results from a knowledge of aerodynamic circulation and the flow pattern induced by a rough cylinder rotating rapidly in still air. The rotational movement of the rotor causes the fluid in which the device is immersed to assume a rotational movement, the velocity of the fluid layer that is in contact with the rotor is equal to the velocity of a point at the surface of the cylinder.

A device for generating an aerodynamic force is provided with less power consumption, this latter not being proportional to the cube of the velocity as expressed by the formula (4) above. In the device of the present invention the drag is only due to the viscosity component, which is proportional to the velocity. Thus, $$F = K . v \quad (5)$$

wherein F is the drag, K is the proportionality constant, and v is the velocity.

Again, replacing in (3) the expression (5) it follows:

$$P = F . v = K . v^2, \quad (6)$$

whence the wasted power varies only with the square of the velocity and not with its cube.

Moreover it should be noted that constant K in (6) is a lot smaller than $K_D$ in (4) since the drag force opposing the rotation is of viscous origin, being proportional to the velocity and not to the velocity squared. It follows that the device of the invention is more efficient, i.e. wastes less power, than the devices of the prior art.

The device of the present invention basically comprises two bodies held in stacked arrangement by conventional coupling means, one or both of which can be driven for rotary movement by a motor device which can be mounted inside or externally to the device by conventional mounting hardware, the lower body being also able to rotate. In one embodiment, the upper or top of the device rotates with respect to a lower body. In another embodiment both the main components can be mounted to rotate thus forming a single compact construction. The first body and the second body will be referred to henceforth as the rotor element and the substantially planar element of the device, respectively.

Accordingly the device of the present invention is formed by a rotor element and a substantially planar element in operative connection, the fluid being separated into two regions, so that the movement of the fluid in the region above the surface of the planar element will not induce, in the fluid of the region below it a movement with similar characteristics. Thus, the fluid in the region below the surface of the planar element can be considered to be motionless, whereas that in the region above the surface is in motion due to the rotation of the rotor element as already described.

Since the higher the velocity of the fluid the lower its pressure according to the Bernoulli effect, it follows that the fluid in the region below the substantially planar element exerts a pressure on the latter which is greater than the pressure exerted by the fluid in the region above the planar element. This difference in pressure results in a force that acts on the surface of the substantially planar element, opposite to the one close to the rotor element. Depending mainly upon the velocity of rotation of the rotor element and upon the dimensions of both the rotor element and the planar element, the resulting force can be capable of supporting in air bodies weighing more than one ton.

The shape of the rotor element is determined by a generatrix such that the same has revolution symmetry and having upper and lower end portions. Consequently, the shape of the rotor element can be a cylinder, a cone, a portion of a sphere or any other shape provided that the rotor fulfills the symmetry condition with respect to at least one axis thereof. Accordingly the rotor can have different transverse cross-sectional areas at different heights. The upper end portion of the rotor is closed while the lower end can be open or closed depending upon whether the motor will be mounted internally or externally to the device.

The second main component of the device is of substantially plane shape having upper and lower opposite faces. Differently from the rotor element the substantially planar element can be of irregular form in transverse cross section provided that its average diameter is greater than the average diameter of any of the aforementioned transverse cross-sectional areas of the rotor, the latter being placed at any position with respect to the upper face of the base. This is to say the axis of the rotor can be shifted from the centre of the base.

The aforementioned motor is provided within the rotor or externally to the device on the lower side of the substantially planar element or distal side of the rotor element for rotational movement of the rotor with respect to the base. According to a further embodiment of the invention the substantially planar element and rotor element can rotate together when in compact construction the device having a continuous wall.

The preferred configuration for this invention comprises a rotatory cylinder and a disc which forms the substantially planar element of the device, the motor being housed within the cylinder. The rotor element is mounted such that the bottom part thereof is spaced from the substantially planar element by a gap, enabling rotation of the rotor with respect to the base.

The motor is mounted on the upper side of the base and internally to the rotor by any conventional fixing means, or welded, whereby the distal end of the shaft of the motor engages the inner side of the top of the cylinder also by means of conventional coupling components, fittings or welds.

The object to be held or lifted by the device is fixed beneath it by conventional fixing means such as rods with screwed ends or welded to the lower side of the substantially planar element this is to say at the side of the substantially planar element opposite to the side on which the rotary element is connected.

In a further embodiment of the invention, the motor can be mounted externally to the device to portions of the lower side of the substantially planar element, the shaft of the same passing through the planar element and entering the rotor.

In still a further embodiment of the device, the use of a cylindrical wall portion, coupled to and surrounding the edge portion of the disc, is intended to ensure motion of the fluid in the vicinity of the cylinder irrespective of the behaviour of the fluid external to the device mainly when high turbulence is present, the wall of the rotor being provided with or without fins.

The object coupled to the device can be lifted in controlled form by either varying the rotational speed of the rotor element or varying the effective area of the planar element. In the first case the resulting force is proportional to the square of the rotational velocity. In the second case the resulting force is proportional to the product of pressure x area. The planar element can be provided with windows or flaps for controlled actuation by any electromechanical or pneumatic means.

With these and other objects in view, which will become apparent to one skilled in the art as the description proceeds and more particularly defined in the attached claims, the device will be described with reference to accompanying drawings.

BRIEF DESCRIPTION OF THE DRAWINGS

The accompanying drawings illustrate embodiments of the invention in which:

FIG. 2 is a side view of the device of FIG. 1 illustrating the fixing hardware;

FIG. 3 is a bottom view of the device without any load to be lifted;

FIG. 4 is a perspective view of an alternative embodiment, having fins on the wall of the rotor and close to the disc;

FIG. 5 is a perspective view of a further embodiment of the device similar to FIG. 4 with a peripheric wall around the outer edge of the disc;

FIG. 6 is a side view of still a further embodiment, similar to FIG. 4 wherein the rotor and disc are assembled together and driven externally by the motor fixed by fittings or anchored in the object to be lifted;

FIG. 7 is a perspective view of still a further embodiment which combines 6, the motor housed within the rotor and an object to be lifted being coupled to the lower surface of the disc.

DETAILED DESCRIPTION OF THE INVENTION

For a better understanding of the present device, a detailed description thereof is now made, with reference to the accompanying drawings.

Figure 1:
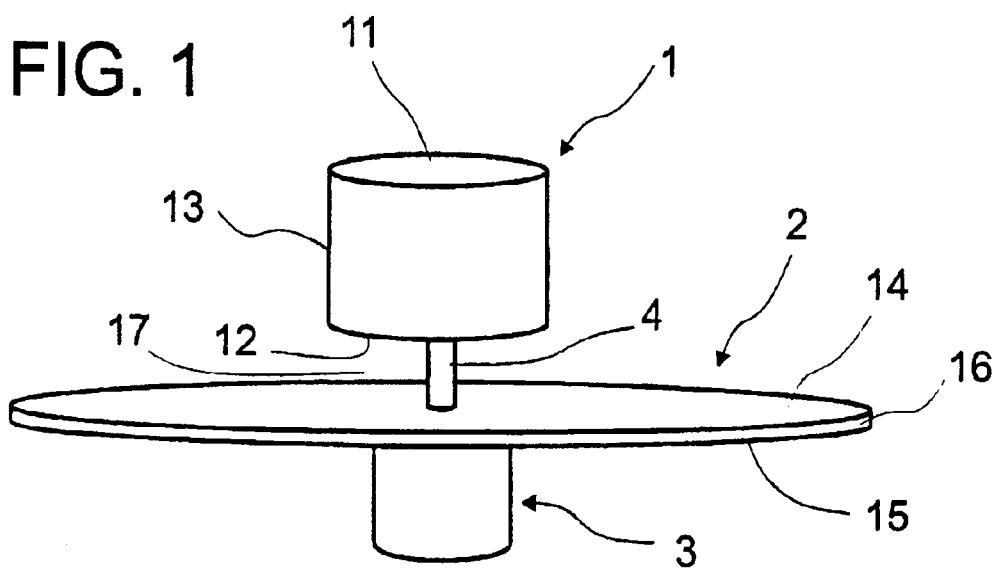
FIG. 1 is a perspective view of one embodiment showing the main components of the device, these being a substantially planar element or disc with a rotor element and a motor on opposite sides thereof.

One embodiment of the aerodynamic force generator is shown in FIGS. 1 to 3, The device comprises a rotor cylinder 1 with top 11 and lower end 12, a disc 2 having upper and lower surfaces 14,15 and a motor 3 with shaft 4.

According to the figures a gap 17 is maintained between lower end portion 12 of cylinder 1 and upper surface 14 of disc 2, thereby enabling the rotation of cylinder 1 with respect to disc 2. Cylinder 1 and disc 2 are operatively connected by shaft 4 of motor 3. The motor 3 is externally mounted beneath disc 2 by rods 5, the ends of which can be welded or screwed to portions of the motor and to the lower surface 15 respectively. The diameter of cylinder 1 is smaller than the diameter of disc 2.

FIG. 4 shows a further embodiment according to which fins 6 are provided on the side surface of cylinder 1 and on disc 2. The fins have a radial distribution and can be welded to portions of surfaces of both the cylinder 1 and disc 2.

FIG. 5 shows a further embodiment which is very similar to the embodiment shown in FIG. 4, where a peripheric wall 7 is provided around and close to the outer edge of disc 2. As mentioned previously peripheric wall 7 ensures a controlled movement of the fluid in the vicinity of cylinder 1 irrespective of turbulence in the external fluid.

FIG. 6 shows a further embodiment in which cylinder 1 and disc 2 are joined to form a single device in which disc 2 rotates together with cylinder 1 and motor 3 is coupled to an object 19 to be lifted by said device. The motor 3 is anchored by conventional mounting hardware to the load or object.

FIG. 7 shows a further embodiment of the device having the same components of FIGS. 1 and 6. However in this embodiment, motor 3 is mounted within cylinder 1, being fixed to a portion of upper surface 14 of disc 2 by coupling means 10 which belong to known mounting hardware. The enclosure of motor 3 can be welded to disc 2 or fixed by any appropriate means. The object 19 to be lifted is fixed to the lower surface 15 of disc 2 by means of rods 18, as already described or any equivalent mounting hardware.

Figure 8:
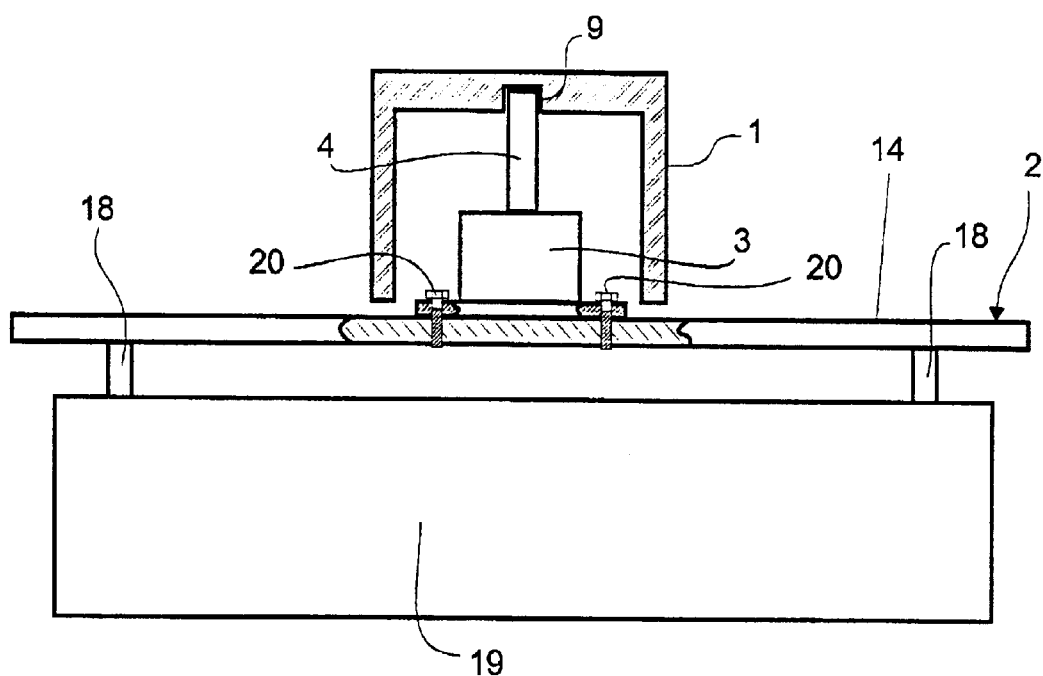
FIG. 8 is a view in longitudinal cross section of FIG. 7.

FIG. 8 shows in partial cross section the mounting of the motor belonging to the embodiment of FIG. 7. By means of a fitting connection 9 on the inner wall of cylinder 1 the distal end of shaft 4 is fixed for driving cylinder 1. The enclosure of motor 3 is rigidly mounted to disc 2 with screws 20, although any suitable connecting means can be used.

Alternatively the upper end portion of the cylinder can be open, the fitting connection 9 can be held in a central position by angle pieces or arms in radial distribution welded to the inner wall of cylinder 1.

For the embodiment of FIG. 8, a resulting aerodynamic force of 60,000N would be expected for the following parameters:

Cylinder 1 with diameter of 1,000 mm and height of 1,500 mm;

Disc 2 with diameter of 4,000 mm; and

Velocity of rotation being 5,000 r.p.m.

Although various embodiments have been illustrated, this was for the purpose of describing, but not limiting the invention. Various modifications, which will become apparent to those skilled in the art of aerodynamics and mounting hardware components, are within the scope of this invention as defined in the attached claims.

I claim:

1. A device for generating an aerodynamic force for lifting an object comprising a rotor means being symmetric in relation to an axis characterized by comprising continuous closed peripheral wall and a substantially planar means positioned close to rotor means and perpendicular to said axis, determining respective upper and lower fluid regions at opposite ends of said substantially planar means said substantially planar means having an average diameter which is greater than the average diameter of said rotor means, a motor means driving said rotor means thereby causing fluid layers adjacent to said rotor means in said upper fluid region to circulate in substantial unison with said rotor means in rotational movement around said axis, and a second peripheral wall around and adjacent to said substantially planar means.

2. A device for generating an aerodynamic force for lifting an object comprising:

rotor means being symmetric in relation to its axis;

a motor means to drive said rotor means, and a substantially planar means, which is positioned close to said rotor means and perpendicular to said axis, for separating at least two fluid regions on opposite sides of the planar means, said planar means having an area delimited by its periphery that is greater than the average of the cross sectional area of said rotor means, wherein the rotor means is provided with a continuous peripheral wall configured to impair a circular movement to the air around said axis in the fluid region on the rotor side of the planar means, when driven by said motor means, to thereby create a pressure differential between the fluid regions.

3. The device for generating an aerodynamic force according to claim 2, wherein said substantially planar means rotates in unison with said rotor means.

4. The device for generating an aerodynamic force according to claim 3, further comprising a second peripheral wall around and adjacent to said substantially planar means.

5. The device for generating an aerodynamic force according to claim 3, wherein the effective area of said substantially planar means has variable surfaces.

6. The device for generating an aerodynamic force according to claim 2, wherein said rotor means comprises blades on a peripheral wall of the rotor means.

7. The device for generating an aerodynamic force according to claim 6, further comprising a second peripheral wall around and adjacent to said substantially planar means.

8. The device for generating an aerodynamic force according to claim 2, further comprising a second peripheral wall around and adjacent to said substantially planar means.

9. The device for generating an aerodynamic force according to claim 2, wherein the effective area of said substantially planar means has variable surfaces.

* * * * *